(12) United States Patent
Iijima et al.

(10) Patent No.: US 7,189,478 B2
(45) Date of Patent: Mar. 13, 2007

(54) LITHIUM SECONDARY BATTERY

(75) Inventors: Tsuyoshi Iijima, Tokyo (JP); Atsushi Sano, Tokyo (JP); Satoshi Maruyama, Tokyo (JP)

(73) Assignee: TDK Corporation, Tokyo (JP)

( * ) Notice: Subject to any disclaimer, the term of this patent is extended or adjusted under 35 U.S.C. 154(b) by 38 days.

(21) Appl. No.: 10/606,749

(22) Filed: Jun. 27, 2003

(65) Prior Publication Data

US 2005/0100782 A1  May 12, 2005

(30) Foreign Application Priority Data

Sep. 27, 2002  (JP) .............................. 2002-283568

(51) Int. Cl.
*H01M 4/58* (2006.01)
*H01M 4/62* (2006.01)
*H01M 4/02* (2006.01)
*H01M 2/16* (2006.01)
*H01M 4/00* (2006.01)

(52) U.S. Cl. ................ 429/231.95; 429/232; 429/235; 429/209; 429/137; 429/246; 429/128

(58) Field of Classification Search ........... 429/231.95, 429/232, 235, 209
See application file for complete search history.

(56) References Cited

U.S. PATENT DOCUMENTS

| 5,296,318 | A | 3/1994 | Gozdz et al. |
| 5,418,091 | A | 5/1995 | Gozdz et al. |
| 6,416,559 | B1 * | 7/2002 | Matsumura et al. ........ 29/623.1 |
| 2002/0034685 | A1 * | 3/2002 | Sato et al. .................. 429/176 |
| 2003/0113636 | A1 * | 6/2003 | Sano et al. .................. 429/330 |

FOREIGN PATENT DOCUMENTS

| CN | 1343023 A | 4/2002 |
| JP | 2520316 | 7/1996 |
| JP | 2642206 | 8/1997 |
| JP | H11-40130 | 2/1999 |
| JP | 2000-149994 A | 5/2000 |
| JP | 2001-176554 A | 6/2001 |
| JP | 2001-243988 A | 9/2001 |
| JP | 2003-77545 | 3/2003 |
| JP | 2003-151529 | 5/2003 |
| WO | WO 01/59869 A1 | 8/2001 |

* cited by examiner

*Primary Examiner*—Patrick Joseph Ryan
*Assistant Examiner*—Angela J. Martin
(74) *Attorney, Agent, or Firm*—Oblon, Spivak, McClelland, Maier & Neustadt, P.C.

(57) ABSTRACT

The invention aims to provide a lithium secondary battery exhibiting the improved function of self safety in an abnormal state without sacrificing battery characteristics. To attain the object, in a lithium secondary battery comprising a positive electrode (3*a*, 3*b*), a negative electrode (2*a*, 2*b*), an electrolytic solution, and a separator, a plurality of positive electrodes (3*a*, 3*b*) and negative electrodes (2*a*, 2*b*) are arranged to construct an electrode structure which includes an outermost layer of electrode on which a back coat layer (11) is formed.

8 Claims, 1 Drawing Sheet

LITHIUM SECONDARY BATTERY

BACKGROUND OF THE INVENTION

1. Technical Field

This invention relates to the safety mechanism of lithium secondary batteries such as lithium ion secondary batteries.

2. Background Art

The recent progress of portable equipment is outstanding, and high energy batteries including lithium ion secondary batteries make great contribution as one factor to the motive power therefor. The current market of lithium ion secondary batteries has grown beyond annual 300 billion yen. It is forecast that a variety of portable equipment will be developed in the future, with an advance of compliant battery manufacturing technology being demanded.

The lithium ion secondary batteries are generally constructed by a positive electrode, a liquid or solid electrolyte layer and a negative electrode. The positive or negative electrode material is prepared by mixing a positive or negative electrode active material with a conductive agent and a binder and coating the mixture onto a current collector. The development trend of such lithium ion secondary batteries demands to increase the energy density of batteries, and the development of low-profile batteries is in progress as one solution.

One approach of manufacturing such low-profile lightweight batteries relates to a polymeric battery which is made thin by substituting a solid electrolyte for the electrolytic solution. This technology is known from, for example, U.S. Pat. No. 5,418,091. As a result of improvements being recently made in battery properties, the battery characteristics is now improved to a far superior level to the early stage when the technology was disclosed.

Batteries using such solid electrolytes include various forms and are generally classified into the following three types:

type (1) using lithium ion conduction in a polymer as the electrolyte, type (2) using lithium ion conduction in a plasticized polymer as the electrolyte, and type (3) using lithium ion conduction in an organic solvent and a plasticized polymer as the electrolyte.

Of these, batteries belonging to type (3) obtained by mixing a solvent component, an organic polymer component and an electrolyte salt to form a gel or solid are in progress toward practical use because they exhibit characteristics comparable to the solution type batteries.

Typical of the method of manufacturing batteries of type (3) using gelled solid electrolytes are the battery manufacturing methods described, for example, in U.S. Pat. No. 5,296,318 and U.S. Pat. No. 5,418,091. These methods involve preparing a solid electrolyte medium from a solid-state polyvinylidene fluoride, joining it to positive and negative electrodes, extracting a plasticizer from the entire battery cell, and introducing an electrolytic solution to gel the entire cell.

Since the entire battery cell is gelled in this way, the liberated electrolytic solution is absent in the battery interior. The battery is thus deemed to take a completely different form from the prior art solution type batteries. According to the disclosure of U.S. Pat. No. 5,296,318 and U.S. Pat. No. 5,418,091, the battery characteristics are also superior.

When the solid-state gelled electrolyte is used, no problem arises on normal use, but outstanding problems arise in an abnormal state. Specifically, safety tests of batteries include an over-charging test, a nail penetration test simulating internal short-circuit (known as hard short-circuit), a heating test and the like. Of these tests, the internal short-circuit test is to forcedly induce internal short-circuits as by penetrating nail under fully charged conditions. As the battery capacity becomes larger, more short-circuiting currents flow. As a result, a rapid temperature rise occurs with the battery, and the battery itself undergoes thermal runaway. An exemplary countermeasure to this problem is to use a separator having a shutdown function. Since this measure relies on the shutdown response of the separator membrane, the battery taking this measure alone encounters a limit when subjected to a nail penetration test of inviting rapid short-circuits.

Another probable countermeasure is to increase the impedance of the battery interior. Since the charge/discharge characteristics of the battery are sacrificed, this measure, though employable in some particular applications, encounters a limit in an actual sense.

Meanwhile, lithium secondary batteries using a laminate type electrode structure are characterized by a high freedom of geometric design as compared with wound type lithium secondary batteries, enabling the construction of low profile, large area batteries.

The outermost layer of the electrode laminate is provided by a negative or positive electrode. In the event an electrode having an electrode active material coated on one surface of a current collector is used as the outermost layer, the outermost layer electrode can warp. Especially when the metal foil serving as the current collector is thinner than 30 μm and the electrode active material layer is thicker than 50 μm, the electrode suffers substantial warpage, imposing a serious problem to the manufacture of electrode structure. Also, the warpage of the outermost layer electrode can adversely affect the adhesion between electrodes and cause to degrade battery characteristics such as cycle performance.

SUMMARY OF THE INVENTION

An object of the present invention is to provide a lithium secondary battery which exhibits the improved function of self safety in an abnormal state without sacrificing battery characteristics.

Another object of the present invention is to provide a lithium secondary battery having a laminate electrode structure which prevents the outermost layer electrodes from warping, is efficient to manipulate during the manufacturing process, and exhibits improved cycle performance.

The above objects are attained by the present invention which is constructed as below.

(1) A lithium secondary battery comprising a positive electrode, a negative electrode, an electrolytic solution and a separator, wherein a plurality of positive electrodes and negative electrodes are arranged to construct an electrode structure which includes an outermost layer of electrode on which a back coat layer is formed.

(2) The lithium secondary battery of (1) wherein said back coat layer has a function of preventing the electrodes from short-circuiting.

(3) The lithium secondary battery of (1) or (2) wherein said back coat layer has a function of preventing the electrodes from warping.

(4) The lithium secondary battery of any one of (1) to (3) wherein said back coat layer contains at least an inorganic material as a filler and/or a resin.

(5) The lithium secondary battery of any one of (1) to (4) wherein said filler is the same material as an electrode active material.

(6) The lithium secondary battery of any one of (1) to (5) wherein said separator has a piercing strength of at least 50 gf.

(7) The lithium secondary battery of any one of (1) to (6) wherein said back coat layer has a thickness of 50 to 500 µm.

(8) The lithium secondary battery of any one of (1) to (7) wherein said electrode structure is a laminate structure.

DESCRIPTION OF THE PREFERRED EMBODIMENTS

Figure 1:
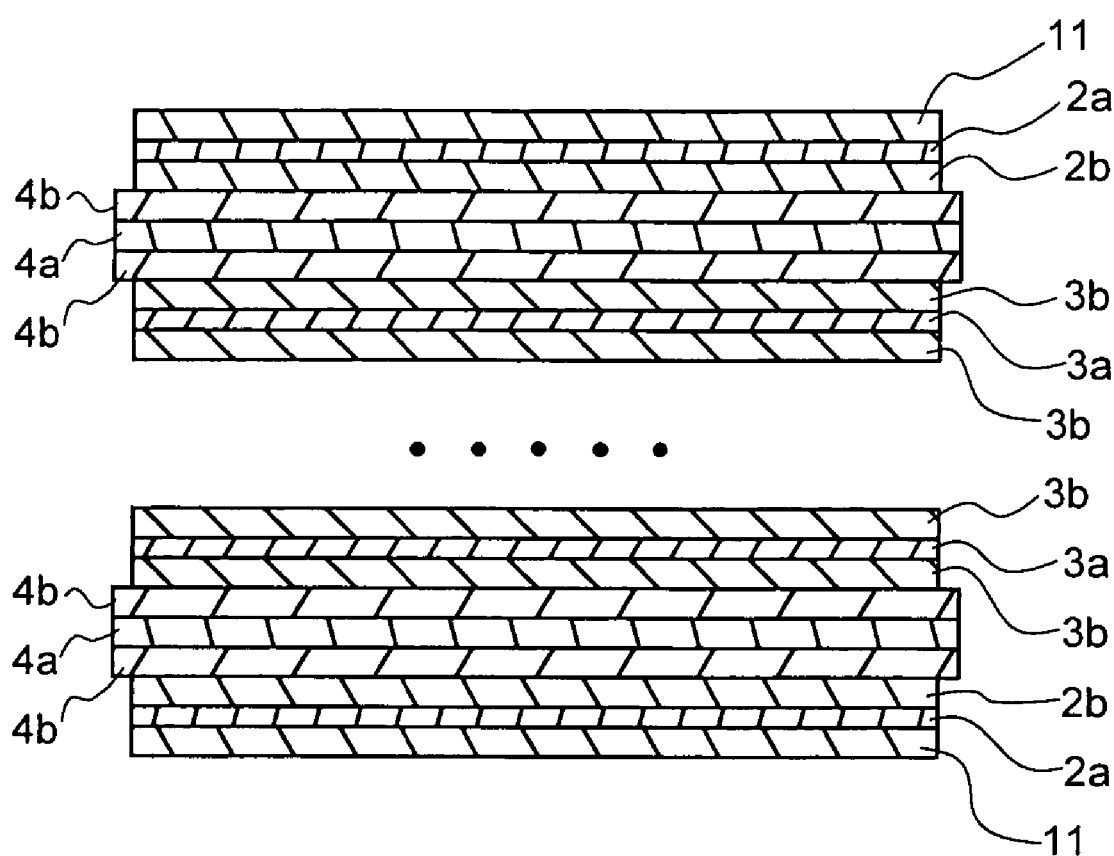
FIG. 1 is a schematic cross-sectional view showing the basic construction of a battery of the invention.

The lithium secondary battery of the invention includes positive electrodes, negative electrodes, and electrolytic solution or solid-state electrolyte, wherein a plurality of positive electrodes and negative electrodes are arranged to construct an electrode structure which includes an outermost layer of electrode on which a back coat layer is formed.

Preferably, the back coat layer contains an electrode active material and/or an inorganic insulating material.

The provision of the back coat layer on the outermost layer of electrode in the electrode structure ensures that a lithium secondary battery maintains extremely high safety in that it continues safe internal discharging without suffering hard internal short-circuiting even in an abnormal state as contemplated in a nail penetration test. Still better, the back coat layer does not sacrifice battery characteristics since it is provided solely on the outermost layer of the electrode structure. That is, the back coat layer does not function as a battery component.

More specifically, the outermost layer of the electrode structure does not contribute to battery characteristics at all in a normal state, but prevents short-circuiting between internal components, especially between electrodes, in a state where the internal electrode structure is subjected to hard internal short-circuiting as by penetrating nail. Particularly in the event where the battery structure is a laminate battery, if the outermost layer is merely a metal current collector, a test of forcedly incurring hard internal short-circuiting as by penetrating nail results in the metal collector foil being drawn inward by the nail to develop internal short-circuits. In contrast, the structure of the invention that the surface of the outermost layer is covered with a material layer capable of preventing hard internal short-circuiting minimizes drawing-in of the collector foil on penetrating nail and prevents hard internal short-circuiting.

FIG. 1 illustrates the basic construction of the lithium secondary battery according to the invention. The battery of the illustrated embodiment includes a negative electrode consisting of a negative electrode current collector 2a and a negative electrode active material-containing layer 2b, a positive electrode consisting of a positive electrode current collector 3a and positive electrode active material-containing layers 3b, and an electrolyte disposed between the positive and negative electrodes and having a separator 4a interleaved between solid electrolyte layers 4b. These components are alternately stacked in the order of negative electrode/electrolyte/positive electrode/electrolyte/negative electrode . . . negative electrode/electrolyte/positive electrode/electrolyte/negative electrode. On the outermost layers of this electrode laminate (top and bottom layers in the figure), back coat layers 11 are formed and disposed. It is noted that the casing which receives the laminate is omitted from the battery shown in FIG. 1.

When the collector metal foil is punctured in the nail penetration test, the back coat layer has the function of preventing the foil from being burred. This back coat layer is preferably formed directly on the collector of the electrode. Also as long as the back coat layer is the outermost layer of the electrode structure, that is, formed on the surface of top and bottom collectors in the event of laminate type electrode structure, the rear side may be either a positive or a negative electrode. However, to further enhance safety and production efficiency, the back coat layer is preferably formed on the outermost surface of the negative electrode collector.

The back coat layer may be made of an electrochemically inactive material, especially a material resistant to battery electrolysis solution, illustratively battery solid electrolyte materials as well as resins used as the electrode binder, for example, PVDF and the like.

When the back coat layer is formed solely of a resin material, however, the film thickness may become insufficient or the anti-shorting effect may decline. For this reason, the back coat layer preferably contains a filler of a predetermined inorganic material.

The filler used herein may be of a material similar to the electrode active material. For example, carbon materials such as carbon black and graphite are useful.

For the sake of convenience, the back coat layer may have the same composition as the electrode material, especially the negative electrode material, that is, the same as the electrode active material-containing layer. Specifically the back coat layer may be a mixture of a carbonaceous material and a resin. A composite of graphite and a resin is especially preferred since it can reduce friction and increase lubricity. When productivity is taken into account, it is more preferred to use a double side coated negative electrode as the outermost layer because the desired effects are achieved without a need for a special electrode serving as the outermost layer.

On the other hand, several deficiencies can arise when the electrode active material is used as the back coat layer which makes no contribution to the battery. Particularly when the carbonaceous material is used as the filler in the back coat layer, a particular type of electrolytic solution used can promote decomposition of the carbonaceous material, specifically graphite, more specifically block graphite, exacerbating cycle performance. Such a phenomenon becomes outstanding particularly when propylene carbonate (PC) is used as a main solvent or a solvent mixture having a large content of PC is used.

Inorganic insulating materials may be used as the filler if it is difficult to use the electrode active material as the filler as described above, or if battery characteristics such as cycle performance are of greater interest.

Examples of inorganic insulating materials include wollastonite, sericite, kaolin, mica, clay, bentonite, asbestos, talc, silicates such as aluminosilicate, metal compounds such as alumina, silicon chloride, magnesium oxide, zirconium oxide and titanium oxide, carbonates such as calcium carbonate, magnesium carbonate, lithium carbonate and dolomite, sulfates such as calcium sulfate and barium sulfate, nitrides such as boron nitride, aluminum nitride and $Si_3N_4$, glass beads, silicon carbide and silica, which may be hollow.

The fillers may be of any shape such as spherical shape or irregular shape like ground powder, with the spherical or block shape being preferred. The fillers may be either primary or secondary particles.

The particle size of the filler varies with the shape and material thereof and is preferably in a range of 0.1 to 10 µm, more preferably 0.5 to 6 µm as expressed by an average particle size calculated on the premise that the inorganic insulating material is spherical. Also preferred is a BET specific surface area of 0.1 to 60 $m^2/g$, more preferably 0.5 to 40 $m^2/g$. When a carbon material such as acetylene black is used, the average particle size is preferably in a range of 10 nm to 1 µm, more preferably 10 to 200 nm, and the BET specific surface area is preferably in a range of 10 to 200 $m^2/g$, more preferably 20 to 100 $m^2/g$.

The fillers may be used in admixture of two or more. The amount of filler added is preferably about 20 to 99% by weight, more preferably about 50 to 98% by weight, provided that the resin content is 100 in weight ratio. If necessary, the filler may be surface treated by vinyl monomer grafting or with various coupling agents such as silane, chromium and titanium coupling agents, prior to use. If the amount of filler added is too small, the back coat layer may have a reduced thickness, rendering it difficult to restrain warpage or to achieve the effect of preventing internal short-circuits upon penetraiting nail. If the amount of filler added is too large, it becomes difficult to support the material on the current collector.

The present invention effectively functions against hard internal short-circuits particularly when a laminate type battery is constructed.

The thickness of the back coat layer is not critical. Too thin a layer may fail to achieve the desired anti-shorting effects whereas too thick a layer raises the undesired problem that the portion which does not contribute to battery characteristics accounts for a larger volume fraction. Specifically, like the electrodes, the back coat layer preferably has a thickness of about 50 to 500 µm, more preferably 80 to 200 µm.

The method of preparing the back coat layer starts with the step of dispersing an inorganic material in a binder solution to form a slurry. The slurry is applied to the outermost layer of electrode. Means for applying the slurry may be the same as the method of preparing the electrode, to be described later. After the back coat layer is coated, an electrode active material layer may be coated on the opposite surface of the back coat layer. Alternatively, after an electrode active material layer is coated, the back coat layer may be coated.

Although the structure of the lithium secondary battery of the invention is not critical, it generally includes a positive electrode, a negative electrode, and a solid electrolyte/separator, and is applicable to laminate type batteries, wound type batteries and the like.

For the electrode to be combined with the solid polymer electrolyte, a choice may be made among well-known electrodes for lithium secondary batteries, although a composition comprising an electrode active material, a gel electrolyte and optionally, a conductive agent is preferably used.

For the negative electrode, negative electrode active materials such as carbon materials, metallic lithium, lithium alloys or oxide materials are useful. For the positive electrode, positive electrode active materials capable of intercalating and deintercalating lithium ions such as oxides or carbon materials are preferably used. Using such electrodes, a lithium secondary battery having good characteristics is obtainable.

The carbon material used as the electrode active material may be selected from among, for example, meso-phase carbon micro-beads (MCMB), natural or artificial graphite, resin fired carbon materials, carbon black and carbon fibers. These materials are used in powder form. Inter alia, graphite is preferred, and block graphite is most preferred for achieving a higher capacity. Its average particle size is preferably 1 to 30 µm, especially 5 to 25 µm. Also preferred is artificial graphite. Too small an average particle size tends to reduce the charge/discharge cycle life and increase the variance (or individual difference) of capacity. Too large an average particle size may exaggerate the variance of capacity, resulting in a lower average capacity. The reason why capacity varies over a range when the average particle size is large is presumably that the contact of graphite with the current collector and the contact between graphite particles become inconsistent.

Preferred oxides capable of intercalating and deintercalating lithium ions are lithium-containing compound oxides, for example, $LiCoO_2$, $LiMn_2O_4$, $LiNiO_2$, $LiV_2O_4$ and the like. These oxides are in powder form preferably having an average particle size of about 1 to 40 µm.

If necessary, a conductive agent is added to the electrode. Exemplary and preferred conductive agents are graphite, carbon black, carbon fibers, and metals such as nickel, aluminum, copper and silver. Inter alia, graphite and carbon black are preferred.

The electrode composition preferably contains, in weight ratio, active material, conductive agent and binder in a ratio of 80–94:2–8:2–18 for the positive electrode, and in a ratio of 70–97:0–25:3–10 for the negative electrode.

As the binder, use may be made of thermoplastic elastomeric resins such as fluoro-resins, polyolefin resins, styrene resins and acrylic resins, and rubbery resins such as fluoro-rubber. Specific examples include polytetrafluoroethylene, polyvinylidene fluoride, polyethylene, polyacrylonitrile, nitrile rubber, polybutadiene, butylene rubber, polystyrene, styrene-butadiene rubber, polysulfide rubber, nitrocellulose, cyanoethyl cellulose, and carboxymethyl cellulose.

The electrode is prepared by first dispersing the active material and optionally, conductive agent in a binder solution to form a coating solution.

The electrode coating solution is then applied onto a current collector. The application means is not critical and may be suitably selected depending on the material and shape of the collector. Metal mask printing, electrostatic coating, dip coating, spray coating, roll coating, doctor blade coating, gravure coating, and screen printing techniques are generally used. Thereafter, rolling treatment is carried out using a platen press or calender roll, if necessary.

The current collector may be selected from conventional ones depending on the configuration of the device where the battery is used and the arrangement of the collector in a casing. In general, aluminum or the like is used for the positive electrode and copper, nickel or the like is used for the negative electrode. It is noted that a metal foil or metal mesh is generally used as the current collector. The metal mesh usually has a lower contact resistance with the electrode than the metal foil, but the contact resistance of the metal foil is acceptably low.

Then the solvent is evaporated off, completing the electrode. The preferred coating thickness is about 50 to 400 µm.

The matrix resins of which the solid electrolyte is constructed include
(1) polyalkylene oxides such as polyethylene oxide and polypropylene oxide,
(2) ethylene oxide/acrylate copolymers, (3) ethylene oxide/glycyl ether copolymers,
(4) ethylene oxide/glycyl ether/allyl glycyl ether copolymers,
(5) polyacrylate,
(6) polyacrylonitrile, and
(7) fluorinated polymers such as polyvinylidene fluoride, vinylidene fluoride/hexafluoropropylene copolymers, vinylidene fluoride/chlorotrifluoroethylene copolymers, vinylidene fluoride/hexafluoropropylene fluoro-rubber, and vinylidene fluoride/tetrafluoroethylene/hexafluoropropylene fluoro-rubber.

Of these resins, polyvinylidene fluoride (PVDF), polyethylene oxide, polyacrylonitrile and the like are preferred, with vinylidene fluoride homopolymers being especially preferred. PVDF homopolymers has a wide oxidation-reduction window, electrochemical stability and satisfactory long-term stability.

The separator sheet which forms the separator is made of a material which is one or more polyolefins such as polyethylene and polypropylene (in the case of two or more polyolefins, a laminate film of two or more plies is contemplated), a polyester such as polyethylene terephthalate, a thermoplastic fluoro-resin such as ethylene/tetrafluoroethylene copolymers, or a cellulose. The form of sheet includes a microporous film having a gas permeability of about 5 to 2,000 seconds/100 cc as measured by the method prescribed in JIS-P8117 and a thickness of about 5 to 100 µm, as well as woven fabric and non-woven fabric.

In the practice of the invention, a so-called shutdown separator is preferably used as the separator. The use of a shutdown separator has the advantage that as the interior temperature of an electrochemical device rises, micropores in the separator close for inhibiting conduction of ions, restraining current flow and preventing thermal runaway. Suitable shutdown separators include separators in the form of microporous synthetic resin film containing at least one of low-density polyethylene (LDPE), linear low-density polyethylene (LLDPE), and high-density polyethylene (HDPE) as described in Japanese Patent No. 2,642,206; and a separator for lithium batteries which is prepared by the method of preparing a separator for lithium batteries in the form of microporous film described in Japanese Patent No. 2,520,316, the microporous film being made from a polyethylene composition containing at least 1 wt % of a ultra-high-molecular-weight polyethylene with a weight average molecular weight of at least $7\times10^5$ and having a weight average molecular weight/number average molecular weight of 10 to 300, the microporous film having a thickness of 0.1–25 µm, a porosity of 40–95%, an average through-pore diameter of 0.001–0.1 µm, and a breaking strength of at least 0.5 kg/10 mm wide, said method comprising the steps of dissolving the polyethylene composition in a non-volatile solvent of an aliphatic hydrocarbon, cyclic hydrocarbon or mineral oil fraction, while heating, to form a uniform solution, extruding the solution through a die to form a gel sheet, removing the non-volatile solvent, and thereafter, orienting the sheet in at least one axial direction and by a fold of at least 2.

Using a solid electrolyte in such a separator, a high-function electrochemical device having both the features of separator and the features of solid electrolyte is obtainable. That is, an electrochemical device having improved adhesion to the electrodes, maintaining film strength, and having resistance to environmental changes and mechanical strength is obtainable. In particular, using a solid electrolyte which is formed by a wet phase-separation technique and a shutdown separator in the manufacturing process, a device having high safety and good electrical properties is obtainable.

In another form, a particulate layer which does not swell in organic solvent base materials and melts at a certain temperature may be disposed within the solid electrolyte layer or on the surface thereof.

The method of applying the matrix resin is not critical, and well-known application methods may be used. For example, metal mask printing, electrostatic coating, dip coating, spray coating, roll coating, doctor blade coating, gravure coating, and screen printing techniques are used. At this point, additives such as surfactants for improving surface wetting properties may be used for the purpose of improving the adhesion between the separator and the matrix resin.

Thereafter, rolling treatment may be carried out using a platen press or calender roll, if necessary.

After the matrix resin is formed, it may be dried by heating at an appropriate temperature.

Following the drying step, the matrix resin may be heat bonded to the separator sheet by heat treatment. The heating temperature is about 100 to 120° C., for example, though it varies with a particular matrix resin used.

The thus obtained gel electrolyte sheet precursor is sandwiched between a positive electrode and a negative electrode, and such units are stacked to form a laminate. The laminate is placed in a casing of aluminum-laminated film or the like, following which an electrolytic solution is admitted whereby the matrix resin is impregnated therewith. In the gelation treatment in the post steps, the matrix resin must be provided with sufficient openings as mentioned above.

Finally, the casing is closed and heat pressed, completing a solid electrolyte based electrochemical device.

The structure of the lithium secondary battery of the invention is applicable to both the wound structure and the laminate structure. In the case of the laminate structure, since a positive electrode, a negative electrode, a solid electrolyte layer and a separator layer are successively stacked, the resulting structure is ready to dispose the back coat layer on the outermost layer. Also, little mechanical constraints are imposed on the separator material since a film strength as required in the wound structure is unnecessary.

Such a positive electrode, a solid electrolyte/separator and a negative electrode are stacked in this order and pressed to form a battery cell.

It is noted that when the invention is applied to the wound structure, the negative electrode web is formed longer than the positive electrode web so that only the negative electrode web may be wound at least one turn as the outermost layer during the winding operation.

The electrolytic solution with which the solid electrolyte/separator is impregnated generally consists of an electrolyte salt and a solvent. The electrolyte salts which can be used include lithium salts such as $LiBF_4$, $LiPF_6$, $LiAsF_6$, $LiSO_3CF_3$, $LiClO_4$, and $LiN(SO_2CF_3)_2$.

The solvent of the electrolytic solution is not critical as long as it is well compatible with the solid polymer electrolyte and electrolyte salt. For lithium batteries or the like, there may be used polar organic solvents which do not undergo decomposition at high operating voltages, for example, carbonates such as ethylene carbonate (EC), propylene carbonate (PC), butylene carbonate, dimethyl carbonate (DMC), diethyl carbonate and ethyl methyl carbonate; cyclic ethers such as tetrahydrofuran (THF) and 2-methyltetrahydrofuran; cyclic ethers such as 1,3-dioxolan and 4-methyldioxolan; lactones such as γ-butyrolactone; and sulfolane. Also useful are 3-methylsulfolane, dimethoxyethane, diethoxyethane, ethoxymethoxyethane, ethyl diglyme, etc.

Provided that the electrolytic solution consists of a solvent and an electrolyte salt, the preferred concentration of the electrolyte salt is 0.3 to 5 mol/l. Usually highest ion conductivity develops at a concentration of about 0.8 to 1.5 mol/l.

The casing is constructed, for example, of a laminate film in which a heat-sealable resin layer such as a polyolefin resin layer (e.g., polypropylene or polyethylene) or a heat resistant polyester resin layer lies on either surface of a metal layer of aluminum or the like. The casing is formed by heat sealing a pair of laminate films along three sides to fuse the heat-sealable resin layers together to form a first seal, giving a bag with one open side. Alternatively, a bag may be formed by folding one laminate film and heat sealing along the opposite sides to form seals.

The present invention is effective particularly when a laminate type battery is constructed or when a laminate type high capacity battery is constructed.

When combined with a shutdown separator or a high impedance means, the battery of the invention becomes more safe.

EXAMPLE

Examples of the invention are given below by way of illustration.

Example 1

A positive electrode was prepared by mixing 90 parts by weight of $LiCoO_2$ as a positive electrode active material, 6 parts by weight of carbon black as a conductive agent, and 4 parts by weight of PVDF, Kynar 761A as a binder. The positive electrode mix was dispersed in N-methyl-2-pyrrolidone (NMP) as a solvent to form a slurry. The slurry was applied to an Al foil as a current collector and dried to complete the positive electrode.

A negative electrode was prepared by dispersing 90 parts by weight of artificial graphite powder as a negative electrode active material and 10 parts by weight of PVDF, Kynar 761A as a binder in N-methyl-2-pyrrolidone to form a slurry. The slurry was applied to a Cu foil as a current collector and dried to complete the negative electrode.

The solid electrolyte components used were:

matrix polymer: Kynar 761A, polyolefin film: polyethylene (PE) H6022, 25 μm, by Asahi Chemical Co., Ltd., and film-forming liquid: 2 wt % Kynar 761A/NMP+1 wt % L-77 (Nippon Unicar Co., Ltd.).

The polyolefin film was immersed in the film-forming liquid and then squeezed through rolls to remove the extra film-forming liquid. The sheet was admitted into water whereby the polymer in the film-forming liquid gelled to a porous state on the polyolefin film.

The positive electrodes, negative electrodes and solid electrolyte separators were stacked such that the double side coated negative electrode lay as the bottom layer, the separator lay thereon, then the double side coated positive electrode, separator, double side coated negative electrode, - - - successively lay one on top of the other, and the double side coated negative electrode lay as the top layer. For bonding between the electrode and the separator, an ethylene/methacrylic acid copolymer was used.

Al and Ni leads were joined to the positive and negative electrodes of the thus obtained laminate, respectively, and the laminate was enclosed with an aluminum laminate film with one side left open.

An electrolytic solution was prepared by mixing 70 parts by volume of ethylene carbonate with 30 parts by volume of diethyl carbonate and adding $LiPF_6$ as a solute in a concentration of 2 mol/dm$^3$. A predetermined amount of the non-aqueous electrolytic solution was admitted through the opening of the aluminum laminate film for impregnation, after which the film was sealed in vacuum.

Subsequent heat pressing at 80° C. completed a laminate type solid electrolyte lithium battery.

Example 2

The positive electrode active material used was $LiNi_{0.33}Mn_{0.33}CO_{0.33}O_2$. Then a laminate type solid electrolyte lithium battery was prepared as in Example 1.

Example 3

To the rear surface of a positive electrode which was prepared as in Example 1, a negative electrode slurry which was prepared as in Example 1 was coated. The resulting electrodes of one side positive electrode/one side negative electrode and the separators were stacked to form the structure in which the electrodes of one side positive electrode/one side negative electrode lay as the bottom and top layers, with the negative electrode faced outside. Then a laminate type solid electrolyte lithium battery was prepared as in Example 1.

Example 4

A battery was prepared as in Example 2 except that a mixture of 30 parts by weight natural graphite and 70 parts by weight fibrous artificial graphite (MCF) was used as the negative electrode active material and the filler in the back coat layer.

Example 5

A battery was prepared as in Example 2 except that block artificial graphite was used as the negative electrode active material and the filler in the back coat layer, and a polyethylene separator having a piercing strength of 600 gf was used as the substrate of the solid electrolyte separator.

Example 6

The use of a filler other than graphite in the back coat layer is described.

A slurry was prepared by dispersing 90 parts by weight of $Al_2O_3$ as the filler and 10 parts by weight of PVdF, Kynar 761A as a binder in N-methyl-2-pyrrolidone and mixing them. The slurry was applied onto a Cu foil as current collector and dried to form a back coat layer. The back coat layer was a coating of 55 μm thick after drying.

To the opposite surface of the current collector having the back coat layer coated thereon, a negative electrode active material layer was coated. A slurry was prepared by dispersing 90 parts by weight of artificial graphite powder (MCF) as a negative electrode active material layer and 10 parts by weight of PVdF, Kynar 761A as a binder in N-methyl-2-pyrrolidone. The slurry was applied to the surface of the current collector opposite to the back coat layer-coated surface and dried.

The electrode having the negative electrode active material layer and the back coat layer coated thereon was rolled to form an electrode to be used as the outermost layer of an electrode laminate.

Using electrodes having a negative electrode active material layer coated on both surfaces of a current collector as the negative electrode other than the outermost layer, a battery was prepared as in Example 2.

Example 7

A battery was prepared as in Example 6 except that $SiO_2$ was used as the filler in the back coat layer.

Example 8

A battery was prepared as in Example 6 except that acetylene black was used as the filler in the back coat layer.

Example 9

A battery was prepared as in Example 6 except that a non-aqueous electrolytic solution prepared by mixing propylene carbonate (PC), ethylene carbonate (EC) and diethyl carbonate (DEC) in a volume ratio of 2:1:7 as a solvent and dissolving therein $LiPF_6$ as a solute in a concentration of 1.5 mol/dm$^3$ was used as the electrolytic solution.

Example 10

A battery was prepared as in Example 2 except that a microporous film of PVdF was used as the solid electrolyte separator.

Comparative Example 1

A negative electrode was prepared as in Example 1 except that only one surface was coated. Electrodes and separators were stacked to form the structure in which the one side coated negative electrodes lay as the outermost layers, with the uncoated side faced outside. Then a laminate type solid electrolyte lithium battery was prepared as in Example 1.

Comparative Example 2

A battery was prepared as in Example 2 except that a cellulose separator was used as the separator.

Comparative Example 3

A battery was prepared as in Example 2 except that a PVdF material filled with $SiO_2$ was used as the separator.

Comparative Example 4

A battery was prepared as in Example 9 except that the one side coated negative electrodes were used as the outermost layers of the battery laminate and the back coat layers were omitted.

The batteries of Examples 1 to 10 and Comparative Examples 1 to 4 were tested initially, then charged at a constant current and constant voltage to 4.2 V, after which a nail penetration test was performed using a nail having a diameter of 1.5 mm. A piercing strength test was performed on the separator, in which a nail having a diameter of 3 mm and a conical pointed tip portion of 2.5 mm long was pierced into the separator at a rate of 200 mm/min. In the test, the separator was fixedly secured by a jig having an opening of 12 mm diameter, and the nail was pieced at the center of the separator. The batteries had a capacity of 2.5 Ah (1 C discharge) in all Examples and Comparative Examples. The results are shown in Table 1.

TABLE 1

| Sample No. | Filler | Negative electrode active material | Positive electrode active material | Electrolytic solution (volume ratio) | Separator | Piercing strength (gf) | Nail penetration test |
|---|---|---|---|---|---|---|---|
| EX 1 | MCF | MCF | $LiCoO_2$ | EC + DEC(3:7) | Polyethylene | 101 | No burst or fire |
| EX 2 | MCF | MCF | $LiNi_{0.3}Mn_{0.3}Co_{0.3}O_2$ | EC + DEC(3:7) | Polyethylene | 101 | No burst or fire |
| EX 3 | MCF | MCF | $LiNi_{0.3}Mn_{0.3}Co_{0.3}O_2$ | EC + DEC(3:7) | Polyethylene | 101 | No burst or fire |
| EX 4 | Natural graphite + MCF | Natural graphite + MCF | $LiNi_{0.3}Mn_{0.3}Co_{0.3}O_2$ | EC + DEC(3:7) | Polyethylene | 101 | No burst or fire |
| EX 5 | Block artificial graphite | Block artificial graphite | $LiNi_{0.3}Mn_{0.3}Co_{0.3}O_2$ | EC + DEC(3:7) | Polyethylene | 600 | No burst or fire |
| EX 6 | $Al_2O_3$ | MCF | $LiNi_{0.3}Mn_{0.3}Co_{0.3}O_2$ | EC + DEC(3:7) | Polyethylene | 101 | No burst or fire |
| EX 7 | $SiO_2$ | MCF | $LiNi_{0.3}Mn_{0.3}Co_{0.3}O_2$ | EC + DEC(3:7) | Polyethylene | 101 | No burst or fire |
| EX 8 | Acetylene black | MCF | $LiNi_{0.3}Mn_{0.3}Co_{0.3}O_2$ | EC + DEC(3:7) | Polyethylene | 101 | No burst or fire |
| EX 9 | $Al_2O_3$ | MCF | $LiNi_{0.3}Mn_{0.3}Co_{0.3}O_2$ | PC + EC + DEC (2:1:7) | Polyethylene | 101 | No burst or fire |
| EX 10 | MCF | MCF | $LiNi_{0.3}Mn_{0.3}Co_{0.3}O_2$ | EC + DEC(3:7) | PVdF microporous film | 71 | No burst or fire |
| EX 11 | MCF | MCF | $LiNi_{0.3}Mn_{0.3}Co_{0.3}O_2$ | PC + EC + DEC (2:1:7) | Polyethylene | 101 | No burst or fire |
| CE 1 | — | MCF | $LiNi_{0.3}Mn_{0.3}Co_{0.3}O_2$ | EC + DEC(3:7) | Polyethylene | 101 | Immediately burst and fired |
| CE 2 | MCF | MCF | $LiNi_{0.3}Mn_{0.3}Co_{0.3}O_2$ | EC + DEC(3:7) | Cellulose | 30 | Immediately burst and fired |
| CE 3 | MCF | MCF | $LiNi_{0.3}Mn_{0.3}Co_{0.3}O_2$ | EC + DEC(3:7) | $SiO_2$-filled PVdF | 7 | Immediately burst and fired |
| CE 4 | — | MCF | $LiNi_{0.3}Mn_{0.3}Co_{0.3}O_2$ | PC + EC + DEC (2:1:7) | Polyethylene | 101 | Immediately burst and fired |

MCF: fibrous artificial graphite,
EC: ethylene carbonate,
DEC: diethyl carbonate,
PC: propylene carbonate The batteries of Examples 1 to 10 did not burst or fire in the nail penetration test in which no hard internal short-circuits occurred when the batteries were nailed. In contrast, for the batteries of Comparative Examples, hard internal short-circuits occurred at the instant when a nail was driven in, and the batteries burst and fired immediately thereafter.

It is presumed from the foregoing results that the batteries fabricated in Comparative Examples 1 to 4 burst and fired because the foil serving as the current collector was drawn in upon penetrating nail so that the batteries incurred hard internal short-circuits. In contrast, the batteries fabricated in Examples remained safe until the end of the test because the foil serving as the current collector was prevented from being drawn in upon penetrating nail so that no hard internal short-circuits occurred.

Of the batteries fabricated, those of Examples 9 and 11 and Comparative Example 4 were tested by repeating charge/discharge cycles of constant voltage/constant current charging of 2.5 Å (1 C) to a cut-off voltage of 4.2 V and constant current discharging of 2.5 Å to 2.5 V. The capacity retentivity is the discharge capacity after 200 cycles divided by the initial discharge capacity. The results are shown in Table 2.

TABLE 2

| Sample No. | Capacity retentivity after 200 cycles (%) |
|---|---|
| Example 9 | 89 |
| Example 11 | 73 |
| Comparative Example 4 | 56 |

Examples 1 to 4 are efficient to manipulate during the fabrication process because the outermost layer electrodes of the electrode structure warp little. In contrast, the battery of Comparative Example 1 in which the outermost layer electrodes warped substantially because of the absence of the back coat layer was difficult to manipulate. Examples 1 to 4 show excellent cycle performance whereas Comparative Example 1 show inferior cycle performance. This is presumably because the outermost layer electrodes deteriorated their adhesion due to warpage with the increasing cycles so that the distance between positive and negative electrodes became non-uniform.

Although Example 5 used block graphite which is advantageous for battery characteristics, but is likely to become detrimental in the nail penetration test, no problem arose in the nail penetration test because a separator having a high piercing strength was used. This result suggests that the use of a separator having a high piercing strength is effective in the nail penetration test. However, since a separator having a high piercing strength has a low shutdown function and a poor over-charging protection function, it is desirable to use an inorganic insulating material in the back coat layer in combination with a separator having a superior shutdown function for enhancing the safety of the entire battery. Example 9 is apparently improved in cycle performance over Comparative Example 4. This is presumably because the back coat layers prevent the outermost layer electrodes from warping and maintain the distance between electrodes uniform, leading to a uniform current density and improved cycle performance.

Additionally, in Example 9, when the weight ratio of $Al_2O_3$:PVdF was changed to 80:20, the film thickness before and after rolling was reduced to one-half, resulting in a decline of cycle performance. When the weight ratio of $Al_2O_3$:PVdF was changed to 95:5, the film thickness before and after rolling was increased to nearly twice, resulting in better cycle performance. These results suggest that too low a filler content leads to a reduced film thickness, losing the warpage controlling effect and cycle performance.

BENEFITS OF THE INVENTION

As mentioned above, the present invention provides a lithium secondary battery which exhibits the improved function of self safety in an abnormal state without sacrificing battery characteristics.

When the invention is embodied as a lithium secondary battery having a laminate type electrode structure, the battery prevents the outermost layer electrodes from warping, is efficient to manipulate during the manufacturing process, and exhibits improved cycle performance.

What is claimed is:

1. A lithium secondary battery comprising an electrolytic solution, a separator, and an electrode structure, which electrode structure comprises a plurality of positive electrodes and negative electrodes, said electrodes being in the form of layers, wherein outermost electrodes of said structure are negative electrodes, wherein a back coat layer is formed on each of said outermost electrodes and covers the entire surface of said outermost electrode, wherein the back coat layers contain at least an inorganic material as a filler and/or a resin, and wherein only the outermost electrodes are covered with said back coat layers.

2. The lithium secondary battery of claim 1, wherein said back coat layers have a function of preventing the electrodes from short-circuiting.

3. The lithium secondary battery of claim 1, wherein said back coat layers have a function of preventing the electrodes from warping.

4. The lithium secondary battery of claim 1, wherein said inorganic filler is present and is the same material as an electrode active material.

5. The lithium secondary battery of claim 1, wherein said separator has a piercing strength of at least 50 gf.

6. The lithium secondary battery of claim 1, wherein said back coat layers each have a thickness of 50 to 500 µm.

7. The lithium secondary battery of claim 1, wherein said electrode structure is a laminate structure.

8. The lithium secondary battery of claim 1, wherein the negative electrodes each comprise a current collector layer and an active material-containing layer and the back coat layers have the same composition as said active material-containing layer.

* * * * *